July 21, 1942.  H. ROSENTHAL  2,290,209
DISTILLATION APPARATUS
Filed March 18, 1939   3 Sheets-Sheet 1

INVENTOR
Henry Rosenthal

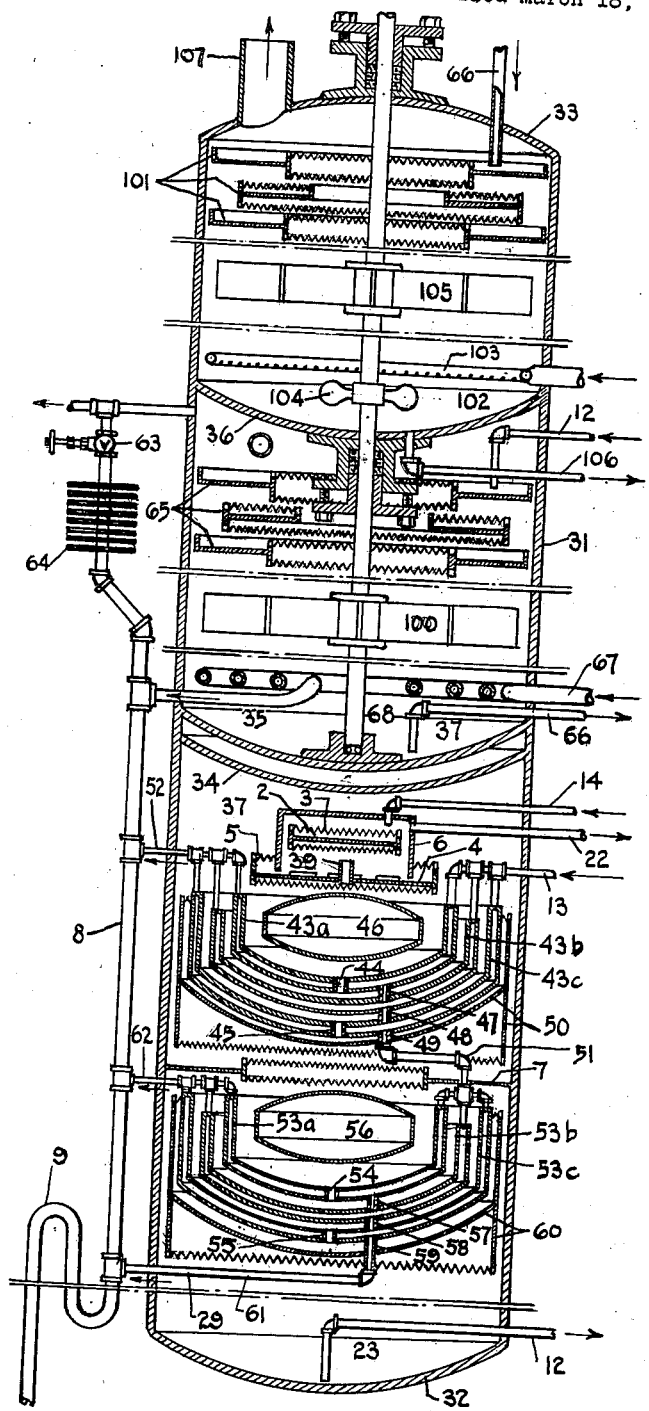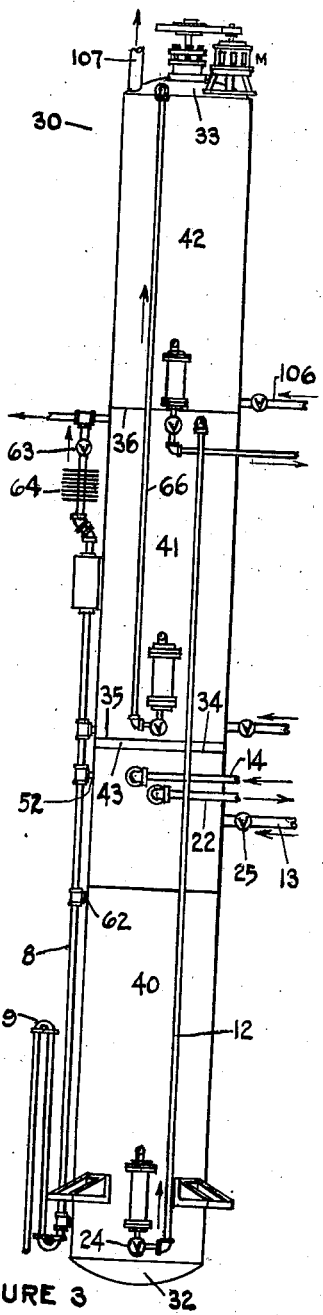
FIGURE 4
FIGURE 3

July 21, 1942.  H. ROSENTHAL  2,290,209
DISTILLATION APPARATUS
Filed March 18, 1939  3 Sheets-Sheet 3
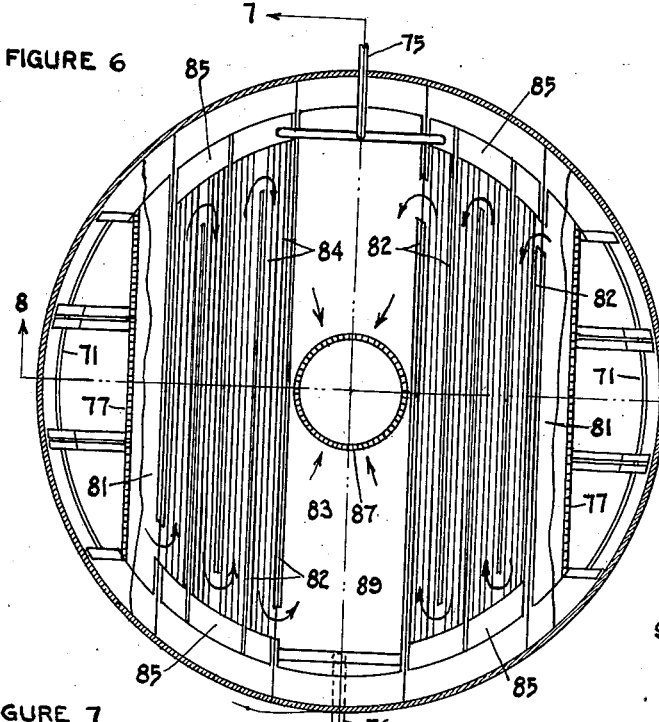
FIGURE 6
FIGURE 7
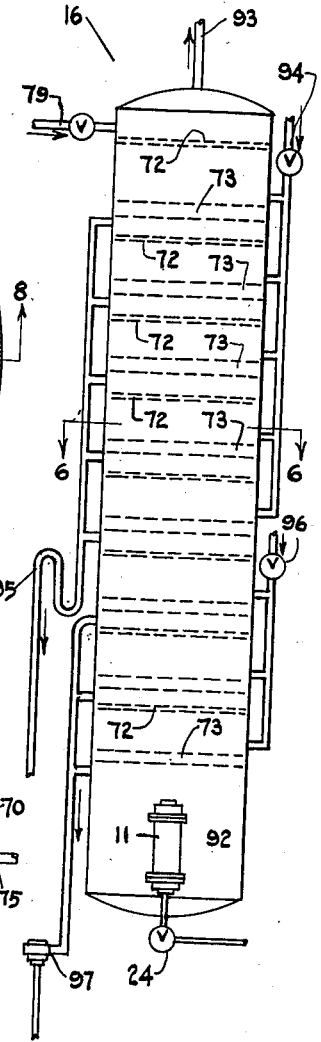
FIGURE 5
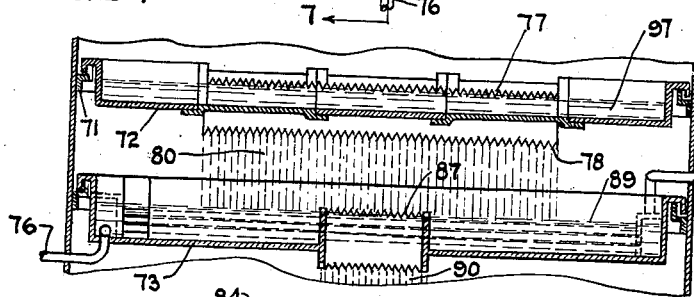
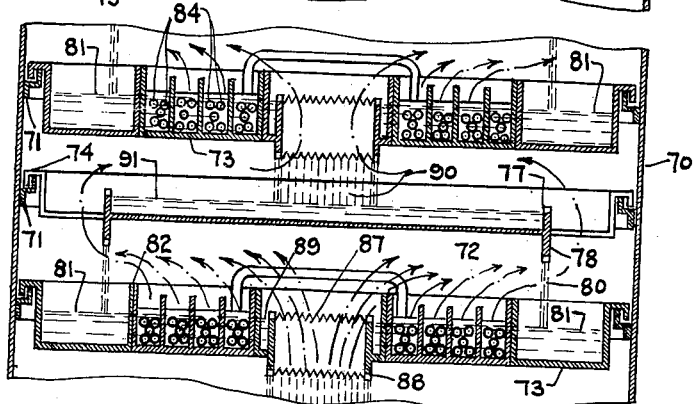
FIGURE 8
INVENTOR
Henry Rosenthal Patented July 21, 1942

2,290,209

UNITED STATES PATENT OFFICE 2,290,209

DISTILLATION APPARATUS

Henry Rosenthal, Yonkers, N. Y.

Application March 18, 1939, Serial No. 262,713

5 Claims. (Cl. 202—158)

My invention relates to a novel still, suitable for separating a solution having a relatively volatile and a relatively non-volatile component. It is particularly applicable where the relatively volatile component is an appreciable portion of the solution and where care must be used in the application of heat to prevent deterioration of the relatively non-volatile component. It is more particularly applicable to the separation of a solution obtained in the treatment of oleaginous solid materials with a volatile solvent for the recovery of the oil, but I do not limit my invention to this particular application, as it has numerous other uses.

My invention is a continuation-in-part of my copending applications: Serial 738,399, filed Aug. 4, 1934, for Oil treating process, Pat. No. 2,152,664; Serial 738,400, filed Aug. 4, 1934, for Oil extraction, Pat. No. 2,152,665; and Serial 218,068, filed July 8, 1938, for Petroleum oil refining.

In Serial 738,399 there is claimed a novel method of extraction and a novel form of extractor; in Serial 738,400, there is claimed a novel method of extraction and a novel form of extractor; in Serial 218,068 there is claimed a novel method of refining petroleum.

Where it is desired to separate two components of a solution, one of which components is relatively volatile and the other relatively non-volatile, by distillation of the volatile component from the solution, the use of a fractionating column and reflux condenser is not necessary for obtaining a good separation of the components. This is particularly the case where the relatively non-volatile component is the desired fraction and the volatile component is condensed and the condensate utilized as solvent in preparing an additional quantity of solution for separation. Where there is sufficient difference between the boiling points of the two components, substantially none of the less volatile component will be volatilized even without refluxing; and the small amount of the less volatile which may be distilled, will be recovered in the new solution.

The use of a reflux condenser, moreover, does not add to the quality of the less volatile component withdrawn from the bottom of the still unless the temperature and pressure conditions at the bottom of the still are such that an appreciable portion of the less volatile component is vaporized under these conditions. On the other hand, the application of all heat at the bottom of the column for the vaporization of the more volatile component, causes the less volatile component to be subjected to maximum temperatures for an appreciable period.

I have found, for example in the separation of propane from the oil solution formed in the extraction of cottonseeds with propane, that if the heat be applied substantially continuously throughout the still, the major portion of the propane may be removed from the solution without subjecting the oil to maximum temperatures for appreciable periods. This results in oil of a higher quality than is obtained when the heat is applied for a longer time. Moreover, in the removal of the initial propane, it is desirable to maintain relatively high pressures in the still in order that the major portion of the propane may be evaporated and the vapors condensed without the need of compressing vapors or gases, as this results in an economy of operation. The heating surfaces must thus be designed to withstand the pressures involved. Moreover, the propane vapors released near the bottom of the column will be at a higher temperature than either the vapors released near the top of the column or with the liquid solution entering the column, and will in fact be superheated in respect to the propane liquid in the condenser. By providing heat exchange between these superheated vapors and liquid solution rich in propane, the superheat is removed in evaporating more propane rather than being carried into the condenser and interfering with the operation of the condenser. Furthermore, I find by heating the solution in relatively thin sheets or layers with a large vapor releasing surface, that not only is the tendency to prime or foam reduced, but also that local overheating of the solution is avoided. All of these advantages, I provide in my novel still.

In the distilling operation, the fresh solution entering the still and containing a large portion of the more volatile component will have an appreciably lower boiling point than does the solution after a portion of the more volatile component has been removed. The boiling point of the solution thus progressively increases until the maximum amount of the more volatile component has been removed. Thus, where the less volatile component can withstand elevated temperatures without deterioration, it is possible to separate the solvent from the more volatile component of the solution with heat of different temperatures, and an appreciable portion of this heat may be of low grade, such as exhaust steam or any other heat of low temperature. Where the solution is delivered to the top of the still and allowed to flow by gravity to the bottom of the still, this low grade heat may be used in the top sections of the still where most of the evaporation of the more volatile component will take place, and high grade heat will be needed only in small amounts in the lower sections.

The vapors from any section are superheated with respect to the solution in the next higher section, and if this vapor is made to pass through the liquid in such next higher section, then the superheat is removed from the vapors in evaporating additional quantities of the more volatile component from the solution. This may be repeated throughout the height of the still, and the vapors leaving the still will thus be at approximately the same temperature as the vapors in the condenser. In this respect, my still is similar to a fractionating column. However, in a fractionating column, for a single cut, heat is supplied at the highest temperature and at the bottom of the column; while in my invention, I supply heat progressively.

The objects of my invention are thus to provide a still in which—

1. The maximum temperature is applied to the solution for a minimum period.
2. High pressures may be maintained within the still.
3. Heat is applied to the solution progressively.
4. Heat exchange is provided between the outgoing vapors and the incoming solution.
5. Heat is applied to the solution while the solution is in relatively thin layers.
6. Large vapor releasing surfaces are provided.
7. Low grade heat may be used in part of the still and high grade heat may be used in another portion of the still.

Other objects of my invention will be apparent from this specification.

My invention may be best understood by reference to the accompanying drawings which form a part of this specification, and in which Figure 1 shows a cross section of one form of my still in which the heating elements are formed of flanged and dished heads.

Figure 3 shows an elevation of a modified form of still of three pressure sections, in a single assembly.

Figure 4 shows an enlarged vertical section of the still of Figure 3.

Figure 5 shows an elevation of a form of still, suitable for relatively large through-puts, and in which the heating medium may be supplied at a plurality of temperatures in a single pressure stage.

Figure 6 shows an enlarged horizontal section on plane 6—6 of Figure 5.

Figure 7 shows an enlarged vertical section on the plane 7—7 of Figure 6.

Figure 8 shows an enlarged vertical section on the plane 8—8 of Figure 6.

Figure 2:
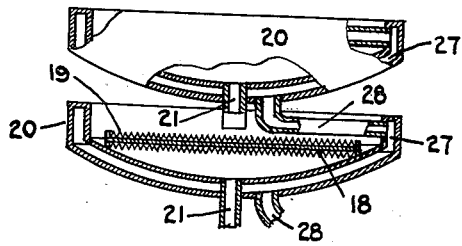
Figure 2 shows an enlarged view of the heating and distributing elements of the still of Figure 1.
Figure 1:
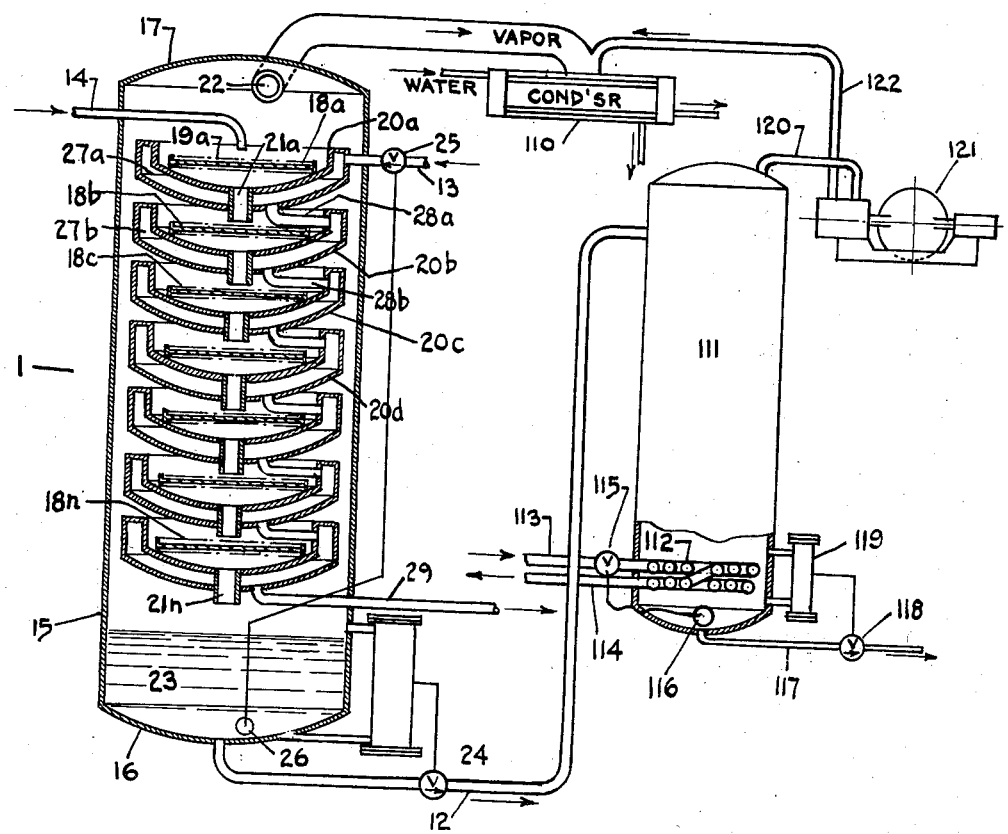

Now referring to Figures 1 and 2, the still 1 is a substantially vertical pressure vessel with the cylindrical shell 15, the bottom head 16, and the top head 17. Solution is delivered to the upper portion of still 1 by means of the pipe 14, and vapor is discharged to condenser 110 by pipe 22.

Still 1 contains a plurality of heated trays, with alternate distributing sections shown in greater detail in Fig. 2. Steam or other fluid, may be used as heating medium. The solution enters the upper distributing section 18a and is discharged at the circumference over the serrated upturned vertical circumferential edge 19a. The solution thus discharged from the distributing section 18a is delivered around the circumference of the heated tray 20a. The solution drains to the center of this tray and is discharged by the nipple 21a into the second distributing section 18b and continues in a like manner until it reaches the bottom of the still. In its passage over the heated trays, solvent is evaporated and the temperature of the solution increases as its concentration increases in its passage downward. The solution is heated only so long as it is in contact with the heated trays. Its time of contact with the heating means is therefore of relatively short duration. Furthermore, the heating is done with the solution in thin flowing films. This has two advantages:

1. It prevents overheating, as the solution in thin films will tend to uniformly maintain the temperature corresponding with the pressure in the still and the concentration of the solution at the instant.
2. The use of the thin films tends to limit any priming or foaming. Priming or foaming is not to be expected in the upper portion of the still where there is a relatively large fraction of the more volatile component. Any bubbles formed in the lower portion of the still will tend to be broken up before they reach the vapor outlet 22.

The concentrated less volatile component from the lowest heating tray 18n is discharged to a pool 23 at the bottom of the still where it is out of contact with further heat. The level of this pool 23 is controlled by the level control valve 24, in pipe 12, which maintains proper level in the pool by opening when a predetermined upper level is reached and closing when a predetermined lower level is reached. The amount of heating of the solution is controlled by the thermostatic valve 25, which admits heating medium to the upper tray 20a, through the pipe 13. This thermostatic valve is controlled by the thermostat 26 in the pool 23.

The material entering the still at the upper distributing section 18a will have a relatively large amount of the more volatile component of low boiling point. The vapor tension and vapor pressure of this solution at any temperature thus depend upon the mol per cent of the less volatile component and more volatile component in the solution, and the temperature of the solution. At any particular temperature, then, the vapor pressure and vapor tension will be at a maximum for the maximum mol per cent of the less volatile component.

Conversely, if the pressure is substantially fixed, as it is in the interior of still 1, the temperature of the solution is a minimum with the maximum concentration of the more volatile component. Thus any attempt to add an increment of heat to the solution results primarily in vaporizing a portion of the solution. Thus the increment of heat so added appears largely as latent heat of vaporization and does not act to raise the temperature of the solution except as the vaporization acts to increase the concentration of the less volatile component in the solution.

As the concentration of the less volatile component increases progressively as the solution passes down the still and as the maximum concentration of the less volatile component is at the bottom of the still, the maximum temperature of the solution within the still will be at this location. Accordingly, I place the control of the heating medium at this location in order to accurately limit the maximum temperature of the solution.

Each heating tray 20, in order to easily withstand the pressures within the still, is composed of two dished heads jointed together by any suitable means such as welding, forming together a chamber 27 as shown in Figure 2, into which the heating medium is admitted. The heating medium passing through valve 25 enters the space 27a (see Figure 1) of the upper tray near the circumference and is discharged near the center of the tray by pipe 28a to the interior space 27b of the next lower tray 20b and so continues down the still until it is discharged through pipe 29.

The pressure in still 1 is controlled by the direct connection of the still 1 to condenser 110, and will depend upon the vapor pressure of the less volatile component at the temperature of the vapors in the condenser. In this manner, all of the vapors generated in still 1 may be condensed without compression. However, the pressure that will be generated within the still will limit the amount of the evaporation that will take place in the still, so that the solution discharged through pipe 12 will contain measurable amounts of the less volatile component. These amounts, however, will be a small fraction of the solution. Where it is desired to eliminate such fractions of the less volatile component, the solution discharged through pipe 12 is conducted to a second still such as still 111 where lower pressures are maintained.

As shown, still 111 is heated by steam entering heating coil 112 by pipe 113, and leaving as condensate by pipe 114. The flow of steam is shown as controlled by valve 115 which is regulated by thermostat 116 in the liquid at the bottom of the still as it is about to be discharged through pipe 117. The level of liquid in the still is controlled by valve 118 operated by the liquid level controller 119. The temperature of still 111 is preferably controlled at the same value by thermostat 116 as that maintained in still 1 under the control of thermostat 26.

Vapor leaves the still through pipe 120 and is delivered to compressor 121 which maintains any desired pressure in the still 111 below that of still 1. Where still 111 is depended upon to eliminate the final traces of the less volatile component, I prefer that a high vacuum be maintained in still 111. Compressor 121 compresses the vapors from still 111 and delivers them to pipe 122 which may lead to condenser 110.

Still 111 may be replaced with a plurality of stills to provide more than two pressure stages, and in Figures 3 and 4 I illustrate such arrangement.

In describing Figures 1 and 2, I have explained the operation of a simple form of my invention, and in which two pressure stages are shown. In some applications, a greater number of pressure stages is preferable for removing the more volatile fraction substantially completely from the solution. A still with three pressure stages contained in a single shell is shown in Figures 3 and 4.

Referring to these two figures, the still 30 is a substantially vertical cylindrical member having the shell 31, the bottom head 32, the top head 33 and the intermediate heads 34, 35, and 36. As shown, the section 40 between the bottom head 32 and the intermediate head 34 is for an elevated pressure above atmosphere; the section 41 between the intermediate heads 35 and 36 is for a pressure about that of the atmosphere; and the section 42 between the intermediate head 36 and the top head 33 is for a high vacuum. The short section 43 between intermediate heads 34 and 35 provides a heat insulating space between the vapor space 37 of section 40 and the liquid space 38 of section 41, in order to prevent the vapors leaving section 40 from being superheated by contact with the metal of head 35, which will be at substantially the same temperature as the liquid in section 41 and thus appreciably hotter than the vapors from section 40.

Solution enters the pipe 14 onto distributer plate 2, and overflows the serrated circumferential lip 3 of the plate, and falls in the form of a rain onto the distributer plate 4. The solution on distributer plate 4 overflows the serrated circumferential lip 5 of the plate and falls in the form of a rain onto the heating tray 43a. The cylindrical closed cover 6 is shown placed above the trays 2 and 4 in such a manner that the vapors leaving the still thru pipe 22 are forced to pass through the rain of solution as it falls from each of the trays as described above.

The solution falling on heating tray 43a flows down the tray over the heating surface and passes through the pipe nipple 44 onto the heating tray 43b, over which it passes upwardly and overflows the circumference of the tray onto the heating tray 43c. The solution flows down tray 43c and passes through the pipe nipple 45 onto distributer tray 50. It overflows the upper serrated edge of the distributer tray 50 and falls in the form of a rain from the lower serrated edge of the tray onto the distributer tray 7. I have shown three heating trays 43a, 43b, and 43c, in the upper portion of the high pressure section 40. It will be understood, however, that a greater or less number may be used as desired. In the form shown, both sides of each of the heating trays are used as heating surfaces, and the solution is held in a relatively thin sheet by proper spacing of the trays in respect to each other. The hollow member 46, placed above the upper tray 43a, prevents the solution from remaining on the tray 43a in the form of a deep pool. This hollow member may also be used for heating surface where desired, but I prefer generally that the hollow member be unheated in order to prevent superheating of the vapors which pass over the upper surface of the member 46 and through pipe nipple 39 on their way to the vapor outlet pipe 22. As shown, the hollow member 46, and the heating trays 43a, 43b, and 43c, are formed from flanged and dished heads united with each other in any suitable manner, as for instance, by welding. Heating medium, as steam, enters the hollow interior of the heating trays through the pipe 13, and steam and condensate passes through nipples 47, 48, and 49 into outlet pipe 59. Pipe 52, suitably connected to each of the heating trays, serves for removing air or other non-condensable gases from the interior of the trays, and thus to provide for free circulation of steam to the trays.

Solution falling from the upper portion of the high pressure section 40 onto the distributer tray 7 overflows the upper serrated edge of the distributer tray and falls in the form of a rain onto the heating tray 53a below. All vapors generated in section 40 below the distributer tray 7 are forced to pass through this rain and to enter into heat exchange with the falling solution. The solution passes over heating trays 53a, 53b, and 53c, onto distributer tray 60 in the same manner that it passes over trays 43a, 43b, and 43c onto distributer tray 50 as just described. As shown, heating trays 53a, 53b, and 53c are provided with heating medium through the pipe 51, and pipe 62 serves to vent the non-condensable gases from these trays. Pipes 57, 58, and 59 provide for removal of condensate to the pipe 61.

I have shown only two portions in section 40, but as many portions may be provided as are desired, each of the lower portions comprising an upper distributer tray such as tray 7, heating trays with their connections for heating medium such as trays 53a, 53b, and 53c, and a lower distributer tray such as tray 60. For a bottom portion, the tray 60 will discharge into the pool 23 at the bottom of the column. For an intermediate portion, the tray 60 will discharge into a distributer tray in the same manner that tray 50 discharges into tray 7.

Vent pipes 52 and 62 are shown as discharging into the header pipe 8. Pipe 61 from the heating trays of the bottom portion also discharges into this header. At the bottom of the header, a suitable trap such as shown at 9, is provided to prevent loss of steam through the condensate pipe 61. At the top of the header, a suitable valve 63 is provided to prevent loss of steam with the vented non-condensable gases. A small condenser 64 may be provided in line 8 ahead of valve 63. Pipe 12 serves for removing solution from the pool 23 at the bottom of section 40.

The amount of the more volatile material remaining in the solution in pool 23 will depend upon the limitations of temperature that must be imposed to prevent deterioration of the less volatile component. Where my still is used in connection with the separation of a propane and crude cottonseed oil solution such as is obtained in the solvent extraction of cottonseeds with propane, I prefer that the maximum temperature to which the oil is heated be of the order of 200° F., in which event the propane will comprise about 4% of the weight of the solution in pool 23, when the pressure maintained in the section is sufficient to condense the propane with a temperature of condensing water such as is commonly encountered. In order to remove the remaining portions of the propane, the solution is treated under lower pressure conditions. Thus, the solution removed through pipe 12 may be introduced into a still section 41 maintained at about atmospheric pressure. Here the propane content may be reduced to a fraction of one per cent of the solution without exceeding temperature limitations. Still section 41 may be similar to section 40 just described, but in the present example, the portion of the more volatile component is so small that relatively little heat need be provided for its vaporization. Thus as shown, the solution from pipe 12 enters section 41 into a series of distributer trays 65 from which it falls into the pool 37 provided with heating coils 66 supplied with steam through the pipe 67. As shown, a rotary foam breaker 100 is provided in the still above the pool 37. Vapors released from the solution are conducted through the rain of solution provided on the serrated distributer trays 65, before being conducted from the section 41.

Solution from the pool 37 is discharged through pipe 66 to section 42, maintained under high vacuum. Here the last traces of the more volatile component are removed. As shown, the solution enters on a series of distributing trays 101, similar to the trays 65 of section 41. From these trays the solution falls as a rain into the pool 102, provided with the open steam coil 103, and the mechanical agitator 104. Above the pool is the mechanical foam breaker 105. Vapors of solvent and steam leave section 42 by pipe 107 after coming in heat exchange with the incoming solution at the distributer section 101. The propane free oil is withdrawn from pool 102 by pipe 106.

While I have not shown thermostatic control of the heating medium in Figures 3 and 4, in order that the drawings be not needlessly complicated, I prefer that such thermostatic control be applied in the same manner as is illustrated in Figure 1; and that substantially the same maximum temperature be maintained in each of the sections of the still 1, by means of a separate thermostat in each section, each of the separate thermostats controlling the heating medium to that section of the still corresponding with the location of the particular thermostat. In placing the thermostat in each section, it should be preferably placed in the hottest location in the section, as, for instance, in the pool at the bottom of the section.

Now, referring to Figures 5, 6, 7, and 8, I have shown a modified form of still, applicable to treating relatively large quantities of solution, and particularly adaptable for use where higher temperatures may be utilized, as for instance in separating propane from lubricating oil. This modification is provided with two temperature stages of heating in a single pressure stage, which pressure stage may correspond with the stage of section 40 of Figures 3 and 4, or with still 1 of Figure 1.

In Figures 5, 6, 7 and 8, the still 16 is shown as a closed, vertical, cylindrical pressure vessel, having the metallic cylindrical shell 70. This shell is provided with a series of rings attached to the shell, the rings having a Z section as shown at 71. These rings serve for mounting a series of alternate trays 72 and 73, trays 72 being distributer trays and trays 73 being heating trays. I prefer that each of these trays be made sectional so that it may be brought through a convenient manhole in the shell 70, so that the trays can be formed on the interior of the shell merely by hanging the inverted L-shaped lip 74 of the sections over the upstanding flange of the Z rings 71. The trays may thus be built up, starting at the bottom tray and continuing to the top. The heating pipe connections 75 and 76 to each heating tray may be made up tight before the next superimposed distributer tray is placed in position.

Each distributer tray 72 completely covers the central portion of the still as shown in the sectional elevations, Figures 7 and 8. At each edge the distributer tray terminates in an overflow weir 77 having serrated edges. Solution entering the distributer tray either from the feed line 79 at the top or from a superposed heating tray below the top, overflows the weir 77 and drips as a fine rain 80, from the serrated lower edge of the weir 77.

This rain 80 falls in the pools 81 of the heating tray immediately below. From the pools 81, the solution is conducted by the baffles 82, over the heating coils 84, where the solution is heated in relatively thin sheets. The path of the solution past the coils is shown by the solid arrows of Figure 6. Each heating coil comprises the tubes 84 secured in the headers 85. After leaving the heating coils, the solution enters the pool 89 from which it overflows the serrated circular weir 87 and drips as a fine rain 90 from the serrated lower edge of the weir 87.

This rain 87 falls into the pool 91 of the distributer tray immediately below, from which the solution falls over the weir 77 as described above. In this manner, the solution continues down the tower until it enters the pool 92 at the base of the tower, from which it is discharged through valve 18 operated by the level control mechanism 19.

As will be noted, particularly in Figure 8, all the vapors generated on any of the heating trays below any particular distributer tray must pass through the rain of liquid solution falling from the particular distributer tray. Also, these vapors must pass the rain of liquid solution descending to the particular distributer tray from the heating tray immediately above. In this manner the vapors are forced into heat exchange with the descending liquid, so that the vapors leaving the top of the still through pipe 93 will be substantially the same temperatures as the liquid entering through pipe 79. It will be noted that the temperature of the liquid at any point in the still will be determined largely by the concentration of the solution at that point. As the amount of solvent in solution decreases progressively downward through the still, the temperature of the solution increases progressively as the solution passes downward through the still. Thus, the vapors released on a lower heating tray will be superheated with respect to the liquid on the heating tray next above, or any of the other heating trays above. But as this superheated vapor is forced into intimate contact with the descending liquid, the superheat is used up in evaporating an additional amount of solvent.

Relatively low temperatures are required to evaporate the bulk of the propane from the solution, so that low pressure steam entering through pipe 94 and discharging as condensate through trap 95, may be used as heating medium for the coils in the upper heating trays. For the bottom heating trays, a high temperature vapor is preferably used as the heating medium, entering through pipe 96 and discharging through trap 97.

It will be apparent that while I have used propane solutions in the examples which I have used for the illustration of my invention, other solutions may readily be treated in a like manner. Moreover, in the illustrations, I have referred to the heating medium as steam, but other heating media may be used as best suits the particular application. Thus, hot water or vapors of a low boiling liquid may be used in the closed coils where low temperature heat is desired; or hot oil, or the vapors of a high boiling compound as diphenyl, diphenyl oxide, mercury, etc., may be used where high temperature heat is desired. Also, it will be apparent that many other changes may be made in my invention without departing from the scope of the invention as defined in the appended claims.

Now having described my invention in a manner that it may be readily understood by one skilled in the art, I claim:

1. In a system of distillation, a closed still for the continuous separation of solvent from a solution, said still comprising a vertical closed cylindrical vessel adapted for pressure and containing alternately a plurality of distributer trays and heating trays, each distributer tray being a plate adapted to discharge solution around its periphery to the heating tray below, each heating tray being two dished heads joined together in a manner to form a closed interior space between said heads for the circulation of heating medium, means for conducting solution to the still, means for withdrawing solvent vapors and liquid solute from the still, and means for conducting heating medium to and from the heating trays.

2. In a system of distillation, a closed, vertical pressure vessel having an inlet for solution and an outlet for solvent vapors both disposed near the top of the vessel; an outlet for solute disposed near the bottom of the vessel; and a plurality of alternate serrated heating trays and serrated distributing trays arranged so that the passages by the heating trays are staggered with relation to the passages by the distributing tray and that external heat may be applied to the solution progressively as the solution passes downwardly through the vessel, and that vapors generated on a lower heating tray are passed thru the solution descending from the serrations of a superimposed heating tray.

3. In a system of distillation, a closed, vertical pressure vessel having an inlet for solution, an outlet for solvent vapors, and an outlet for liquid solute; heating means disposed progressively within said pressure vessel to progressively apply heat to and raise the temperature of the solution; and baffle means provided with serrations adapted to comminute the descending liquid disposed between the heating means; and passages by the heating means staggered in relation to the passages by the baffle means to conduct ascending vapors through a comminuted stream of descending solution, descending from the serrations of the baffle means.

4. In a system of distillation, a closed, vertical vessel having an inlet for solution and an outlet for vapors both disposed near the top of the vessel; an outlet for liquid disposed near the bottom of the vessel; means for applying external heat progressively to the solution while the solution is flowing in relatively close proximity to said heating means and as said solution progresses from the top to the bottom of said vessel, distributing means provided with serrations adapted to comminute the descending liquid disposed alternately with said heating means, and openings in said heating means and distributing means so placed relative to each other that the passages by the heating means are staggered relative to the passages by the distributing means and that the vapors generated by a lower heating means are passed through the solution descending from the serrations of a superimposed distributing means.

5. In a system of distillation, a closed, vertical vessel having an inlet for solution and an outlet for vapors both disposed near the top of the vessel; an outlet for liquid disposed near the bottom of the vessel; means for applying external heat progressively to the solution while the solution is flowing in relatively close proximity to said heating means and as said solution progresses from the top to the bottom of said vessel, whereby the temperature of the solution is progressively increased from the top to the bottom of said vessel, said means for applying heat being provided with serrated overflow means for said solution; distributing means disposed alternately with said heating means; and openings in said heating means and distributing means so placed relative to each other that the passages by the heating means are staggered relative to the passages by the distributing means and that the vapors generated by a lower heating means are passed through the solution descending from the serrations of a superimposed heating means.

HENRY ROSENTHAL.